3,342,557
PROCESS OF REGENERATING GRANULAR MATERIALS IMPREGNATED WITH ACTIVE COMPONENTS IN A CYCLIC PROCESS OF PRODUCING CHLORINE
Paul Metaizeau, Dombasle, France, assignor to Solvay & Cie, Brussels, Belgium
Filed Aug. 7, 1963, Ser. No. 300,613
Claims priority, application France, Aug. 10, 1962, 906,704
5 Claims. (Cl. 23—219)

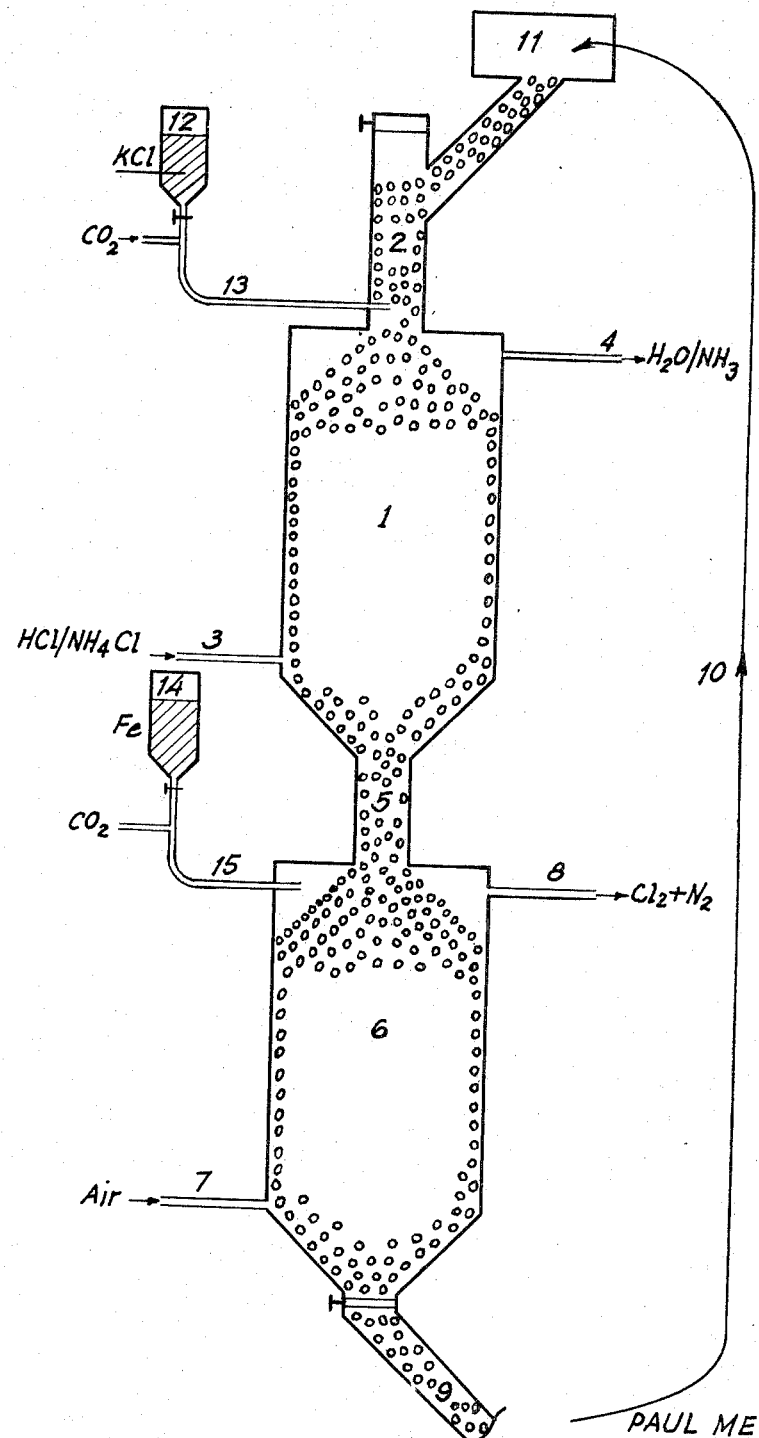

This invention relates to a method of regenerating granular materials with active components, especially to a gravity-flow moving bed of granules, and even more particularly in a process for producing chlorine from $HCl$ or $NH_4Cl$.

Granular materials, catalytic or reactive, comprising an inert supporting material impregnated with active components, and passing in cyclical fashion through one or more reaction chambers, are used, generally at elevated temperatures, to effect many chemical reactions among which can be mentioned catalytic cracking, isomerization, hydrogenation, aromatization, chlorination and dehydrochlorination.

In particular, according to U.S. Patent 2,577,808, contact materials of this kind have been used for the production of chlorine from hydrogen chloride.

These granular materials, passing in cyclical fashion from one reaction zone into another, can be used in the form of tablets, spheres, cylinders or irregular forms. They are generally formed of a porous support impregnated with one or more active elements.

During the reaction cycles to which they are subjected, the granular materials become gradually depleted of active components. Since the latter are generally found at the surfaces of the granules, they can become lost, for example, by evaporation, the vapor pressures of some salts being quite appreciable at the high temperatures of some reactions, and also by erosion of the outer surfaces of the granules. It follows from these phenomena that the yield from such granules gradually diminishes and in the course of a few weeks they can become totally inactive.

Consequently, it then becomes necessary to continually or periodically regenerate the granules with active components. This regeneration can be accomplished by reimpregnating the supports, but this is a very delicate and laborious operation requiring the following steps:

(1) emptying the reactors,
(2) cooling the granules,
(3) reimpregnation,
(4) drying the reimpregnated granules,
(5) reheating and
(6) reintroducing the material into the reactors.

An object of this invention, therefore, is to provide a relatively simple process for regenerating granular support materials.

A particular object is to provide a process for regenerating a gravity-flow moving bed of granules.

A further object is to provide a process wherein a gravity-flow moving bed of granules are regenerated during a process for producing chlorine from $HCl$ and/or $NH_4Cl$.

Upon further study of the specification and claims, other objects and advantages of the present invention will become apparent.

To achieve these objects, it has been found that it is possible to regenerate the granular materials in the locality of the reactors without disturbing the progress of the chemical reactions which occur therein, by just conveniently affixing the active elements on the granules at a point in the process where the surfaces of the granules have an affinity for the active components.

According to this invention the granular materials comprised of active components on inert supports are carried by gravity-flow through one or more reaction chambers, usually maintained at high temperatures. The granular materials are regenerated by the injection of particulates of the active components into a zone in the process where the active components that impregnate the supports are substantially in a sticky condition. By the word "substantially" in this context it is intended to include the zone where the active components are actually sticky, and also a zone immediately preceding the "sticky zone."

The attached drawing is a schematic elevation of a preferred embodiment of this invention.

The condition of the surface layers of the granular materials actually varies, depending on the composition of the surface and on the environment in each particular zone of the process. If the zone is at a high temperature, or if the active components already on the granules are easily fusible, the surfaces of the granules can be in a sticky condition. Under such conditions it may be expedient to inject the active components in a finely divided state because they will then immediately bond to the active surface components of the granules.

In operating according to this invention, when the granular materials are screened after leaving the injection zone, it is not practical to separate the finely divided material because analysis of the material definitely shows that the injected material has become fixed.

By this procedure it is possible to keep the composition of the granular materials constant, to perform the chemical reactions under always identical conditions, and to keep the composition of the reaction products constant by injecting the active elements whenever it has been observed that their amount has become inadequate.

It is to be appreciated that the granules can be regenerated with active components even if the granules have been completely depleted of active components, the essential consideration being that the surfaces of the granules be sticky toward the active material. On the other hand, an important feature of this invention is to regenerate the granules at a sufficient rate so that the rate of depletion of the active surface components is kept to a minimum, if not completely stopped, or conversely the surface is even enriched beyond the initial concentration.

It is also to be noted that the process of this invention unexpectedly does not result in any appreciable agglomeration of granules even though their surfaces pass through a sticky state, and at that state are enriched with additional surface components. The reason for this is that the injected product is extremely divided: so it covers uniformly the granules.

As, besides, the ratio between the quantity of the injected particulates of active elements and the quantity of the granules is very low, the sticky surface layer is not thick enough to ensure the agglomeration of the granules.

If in contrast to this invention, the active elements are injected in a region where the surface layers of the granules are hard and solid, it will be found that when the material which leaves that region is screened, the entire amount of the injected material, always in a finely divided condition, will be recovered.

Although the invention is generally useful for regenerating all types of granular materials in a moving stream, it finds a particularly interesting application in a process for producing chlorine from hydrogen chloride and/or ammonium chloride.

It is known that chlorine can be produced by the alternate chloridation and oxidation of polyvalent metal oxides. Processes of this kind comprise, in the first stage, the passage of hydrogen chloride and/or ammonium chloride vapors over the metal oxide containing materials to form the corresponding chlorides, and then in the second step the oxidation of these chlorides by oxygen or air, with the liberation of chlorine.

With iron oxide, the reactions are fundamentally as follows:

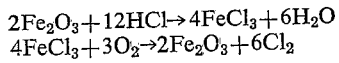

The process is advantageously conducted with reactive materials containing, in addition to ferric chloride, potassium chloride in order to lower the volatility of the ferric chloride, a promotor consisting of cadmium or copper chloride, and an inert support.

High yields are obtained by performing the successive chloridations and oxidations in a moving layer.

The reacting masses move downwardly through the superimposed chloridation and oxidation chambers in which they meet countercurrents of hydrogen chloride and of a molecular-oxygen-containing gas. Since the masses are continually recycled, good yields can be obtained, even if the rate of conversion per pass is relatively low. With air used as the oxidizing gas, it has been possible to obtain by this method gaseous mixtures containing more than 20% by volume of chlorine.

The amount of active component in the reacting masses has a determining influence on the yield from the chloridation and oxidation reactions: a diminution of the total amount of active components reduces the amount of gas that can be treated, while a change in the relative amounts of the different salts and oxides can change the composition of the reacting gas, and especially its chlorine content.

During the course of the reaction cycles, the reacting masses which have been subjected thereto will become gradually depleted in active components. This depletion can be caused by the vaporization of certain salts, especially ferric chloride, which have appreciable vapor pressures at the high temperatures of the reaction zones, or there can be loss by erosion of the surfaces of the granules, the surfaces being richest in active ingredients. Thus, the yield from the chlorine-producing apparatus gradually becomes lower, and after a few weeks the reacting masses can become entirely inactive.

The condition of the inorganic compounds which impregnate the granular masses varies greatly with the compositions of such compounds. When most of these compounds are chlorides, they form a relatively fusible mass, and at operating temperatures they are in a sticky condition. In contrast, when a large portion is in the form of oxides which are less fusible, the granular materials remain hard and solid.

The chemical composition of the granules changes constantly during the reaction cycles to which they are subjected. The active components of the granules are in the form of chlorides when they are or have been in contact with chlorine gas, hydrogen chloride and/or ammonium chloride, then in the chloridizing zone or in the outlet therefrom. It is in this zone or immediately in front of the entrance into this zone, where, according to this invention, the active components are injected in a finely divided condition. They are mostly in the form of chlorides, and because of the high temperatures, are in a sticky condition.

The active elements can be injected in the form of chlorides or in any other form which can be converted into a chloride in the injection zone. In particular, the potassium can be injected as a chloride, a carbonate or a hydroxide, and iron and copper in the form of metallic filings, or if combined, in the form of a chloride, carbonate or oxide. In any case, it is essential that the solid to be introduced is in a finely divided condition so that it will be dispersed uniformly throughout the entire injection zone and so that a maximum number of granules will be in contact with it. To assist in the dispersion, the material is injected in the region where the granules are moving at maximum speed, for example in the restricted space which separates the two reaction zones, or at the top of a reactor where a cone of granules can be powdered with active material.

According to an interesting and preferred modification of this invention, the potassium is injected separately from the iron and the copper. The injection of the potassium, preferably in the form of the chloride, can be effected in the straight duct on top of the chloridation chamber. There, the granules pass through at a high velocity, which favors the dispersion of the salt.

As for the iron and finally the copper, they are preferably introduced as filings at the top of the oxidation chamber, which is at the outlet of the chloridizing zone. The finely divided material can then easily be dispersed by sprinkling the cone in the large part of the oxidation chamber, which cone is formed by the flowing granules emerging from the duct separating the two chambers. In this manner it will be possible to avoid a concentration of the filings in the axial portion of the chamber, a condition which would be sure to occur if the filings are introduced directly into the narrow portion. The contact between the injected iron and the chlorine that is in the gas from the oxidation chamber assures the transformation of the iron into ferric chloride which is fixed directly by the granules.

The injection of solids can be accomplished by any kind of apparatus, but a pneumatic injector is especially suitable.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example*

The results of some experiments with the apparatus shown diagrammatically in the drawing are now described.

This installation, which is used for the production of chlorine from hydrogen chloride and/or ammonium chloride, consists of two superimposed reaction chambers, traversed successively by granular contact masses impregnated by active components.

The installation comprises a chloridizing chamber 1 provided with a duct 2 for introducing granules, conduit 3 for injecting hydrogen chloride and/or ammonium chloride, conduit 4 for the escape of steam and eventually ammonia, and a duct 5 for delivering the granules to the oxidation chamber 6. This last chamber is provided with conduit 7 for injecting air, conduit 8 for the escape of a mixture of nitrogen and chlorine, and a granule discharge duct 9. These granules are then elevated by an apparatus 10 (not shown), which can be an air lift or any other type of conveyer. The granules are then deposited in the reservoir 11 from where they return to the duct 2.

A reservoir 12 containing powdered potassium chloride is connected by a pneumatic injector 13 with the duct 2 supplying the granules. An identical device 15 is fitted to the oxidation chamber 6 for injecting iron filings into the upper empty part of the oxidation chamber to powder the granules.

During operation, the chloridizing chamber is kept at a temperature between about 450 and 500° C., and the oxidizing chamber between about 530 and 560° C. The granules are in a viscous adhesive condition in the middle of the chloridizing chamber and in the upper part of the oxidizing chamber.

The circulating granules in this apparatus are in the form of cylinders 5 mm. in diameter and 4 to 8 mm. long. They are composed of inert supports of aluminum silicate on which are fixed the different active elements: $FeCl_3$, $KCl$ and $CuCl_2$.

Because of their circulation through the apparatus, the granules gradually lose their active elements. The examples given in the following table show the rapid decrease in the concentration of the active components during the process, and the easy regeneration of them by injection with the active elements in the middle of the installation as shown and described above. The table shows the results of two experiments under identical conditions, one with and the other without the injection of active components.

|  | 1a | 1b | 2a | 2b |
|---|---|---|---|---|
| Content of the materials before the experiment: |  |  |  |  |
| Fe at g./Kg | 2.44 | 1.96 |  |  |
| K at g./Kg | 1.42 | 1.35 | 1.15 | 1.05. |
| Duration of the experiment | 12 days | 12 days | 3 days | 3 days. |
| Injected components |  | Fe+KCl |  | Fe. |
| Content of the materials after the experiment: |  |  |  |  |
| Fe at g./Kg | 2.01 | 1.87 |  |  |
| K at g./Kg | 1.29 | 1.42 | 0.75 | 1.0. |
| Losses percent: |  |  |  |  |
| Fe | 20 | 4.5 |  |  |
| K | 9 | Gain 5 | 35 | 5. |

The results show clearly that the injection of iron filings and of potassium chloride makes it possible on the one hand to avoid or decrease the deletion of active elements, and on the other hand even enrich the granular materials over and above their initial concentration.

In general the size of the injected particulates of active elements ranges from 0.05 to 0.5 mm. as compared to the size of the granular materials which generally range from 3 to 10 mm. The linear velocity of the bed of granular materials past the injection zone ranges from about 4 to 500 cm./min.

The active components can be injected separately or together, and they can be injected periodically or preferably continuously to maintain constant operating conditions.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a cyclic process of producing chlorine from a material selected from the group consisting of hydrogen chloride and ammonium chloride, wherein a gravity-flow moving bed of granular materials is passed through superimposed chloridation and oxidation zones in which the reacting masses moving downwardly therethrough meet countercurrents of hydrogen chloride and of a molecular oxygen-containing gas respectively, while maintaining the chloridizing zone at a temperature of about 350–500° C. and the oxidation zone at a temperature of about 500–600° C., said granular materials comprising solid granular supports impregnated with active components which are selected from the group consisting of compounds of K, Fe and Cu, and wherein during said process there is a decrease in the concentration of active components on said granular supports, the improvement which comprises injecting particulates of said active components into said moving bed at a zone in the process where the active components which impregnate the supports are substantially in a sticky condition, so that the injected particulates of active components adhere to the granular materials of the moving bed.

2. A process according to claim 1 in which the size of the injected particulates of active materials ranges from 0.05 to 0.5 mm. as compared to the size of the granular materials which generally range from 3 to 10 mm.

3. A process according to claim 1 wherein the linear velocity of the bed of granular materials past the injection zone ranges from about 4 to 500 cm./min.

4. A process according to claim 1 wherein, during the process, there exists a region constituted by a restricted space which separates two reaction zones and there also exists a region constituted by the cone formed by the granules at the top of a reaction zone, and wherein the solid to be introduced is in finely divided condition and is injected into one of said regions, in consequence of which the solid will be dispersed uniformly through the entire injection zone and the largest number of granules possible will be in contact with it.

5. A process according to claim 4 wherein the reactions are conducted continuously by gravity-flowing granular materials comprising inert granular supports and active components comprising iron and potassium through said reaction zones, and wherein a decrease in the concentration of K and Fe occurs during said process, the improvement of regenerating the granular materials with K and Fe which regeneration comprises coating said granular supports with additional active material of the character thereon by injecting particulates of a potassium compound selected from the group consisting of KCl, $K_2CO_3$ and KOH, said injection being effected at the top of the chloridizing zone where the temperature is such that the active components impregnating the inert supports are in a substantially sticky condition; and injecting iron in the form of a member selected from the group consisting of iron filings, iron chloride, iron carbonate and iron oxide, said iron injection being effected at the top of the oxidizing zone where the temperature is such that the active components impregnating the inert supports are in a substantially sticky condition.

References Cited

UNITED STATES PATENTS 2,206,399  7/1940  Grosvenor et al. _____ 23—219
2,451,870  10/1948  Richardson et al. _____ 23—219
2,577,808  12/1951  Pye et al. _____ 23—219

OSCAR R. VERTIZ, *Primary Examiner.*

EDWARD STERN, MILTON WEISSMAN, *Examiners.*